(12) United States Patent
Andersen et al.

(10) Patent No.: US 12,533,217 B2
(45) Date of Patent: Jan. 27, 2026

(54) DENTAL ABUTMENT FOR INTER-ORAL SCANNING OR FOR EXTRA-ORAL SCANNING

(71) Applicant: ELOS MEDTECH PINOL A/S, Gørløse (DK)

(72) Inventors: Henrik Andersen, Gørløse (DK); Søren Olsen, Gørløse (DK); Andreas Bak Ingemann, Gørløse (DK); Nichlas Holst Buch-Larsen, Gørløse (DK)

(73) Assignee: ELOS MEDTECH PINOL A/S, Gørløse (DK)

( * ) Notice: Subject to any disclaimer, the term of this patent is extended or adjusted under 35 U.S.C. 154(b) by 47 days.

(21) Appl. No.: 18/692,910

(22) PCT Filed: Sep. 16, 2022

(86) PCT No.: PCT/EP2022/075755
§ 371 (c)(1),
(2) Date: Mar. 18, 2024

(87) PCT Pub. No.: WO2023/041700
PCT Pub. Date: Mar. 23, 2023

(65) Prior Publication Data
US 2024/0261069 A1      Aug. 8, 2024

(30) Foreign Application Priority Data
Sep. 17, 2021   (EP) .................................... 21197483

(51) Int. Cl.
*A61C 9/00*   (2006.01)
*A61C 8/00*   (2006.01)

(52) U.S. Cl.
CPC .......... *A61C 9/0053* (2013.01); *A61C 8/0001* (2013.01)

(58) Field of Classification Search
CPC ........................... A61C 9/0053; A61C 8/0001
See application file for complete search history.

(56) References Cited

U.S. PATENT DOCUMENTS 4,604,060  A  *  8/1986  Weissman ............... A61C 13/30
                                                              433/221
5,106,299  A  *  4/1992  Ghalili ................. A61C 8/0048
                                                              433/172

(Continued)

FOREIGN PATENT DOCUMENTS

WO         2019162446 A1      8/2019

OTHER PUBLICATIONS

WIPO/ISA/EPO, International Search Report and Written Opinion issued in corresponding International Application No. PCT/EP2022/075755 on Dec. 14, 2022, 8 pages.

(Continued)

*Primary Examiner* — Eric J Rosen
*Assistant Examiner* — Hao D Mai
(74) *Attorney, Agent, or Firm* — J. Peter Paredes; Amin Wasserman Gurnani LLP

(57) ABSTRACT

The present invention relates to the field of devices for implantation. More specifically, the invention provides a scan body or scanning abutment for dental implants, which is suited for high precision inter-oral scanning while mounted on a dental implant. The scan body is also suited for scanning when mounted on an implant analog, e.g. mounted in a model of the patient's mouth.

13 Claims, 10 Drawing Sheets

(56) References Cited

U.S. PATENT DOCUMENTS

| | | | | | |
|---|---|---|---|---|---|
| 5,667,384 | A | * | 9/1997 | Sutter | A61C 8/0048 433/172 |
| 5,915,968 | A | * | 6/1999 | Kirsch | A61C 8/0065 433/169 |
| 6,283,752 | B1 | * | 9/2001 | Kumar | A61C 8/0001 433/172 |
| 6,488,501 | B1 | * | 12/2002 | Harding | A61C 8/0001 433/214 |
| 6,951,460 | B2 | * | 10/2005 | Halldin | A61C 8/0072 433/213 |
| 8,419,429 | B2 | * | 4/2013 | Wang | A61C 8/0068 433/214 |
| 2003/0125741 | A1 | * | 7/2003 | Biedermann | A61B 17/7035 606/264 |
| 2004/0180308 | A1 | * | 9/2004 | Ebi | A61C 8/005 433/173 |
| 2013/0309628 | A1 | * | 11/2013 | Orth | A61C 1/084 433/173 |
| 2013/0309632 | A1 | * | 11/2013 | Sanders | A61C 8/0053 433/173 |
| 2014/0011155 | A1 | * | 1/2014 | Thomsen | A61C 8/0001 433/29 |
| 2014/0242545 | A1 | * | 8/2014 | Brun | A61C 8/0062 433/173 |
| 2014/0377714 | A1 | * | 12/2014 | Jahn | A61C 8/0016 433/29 |
| 2016/0067016 | A1 | * | 3/2016 | Hur | A61C 8/0089 433/147 |
| 2018/0303584 | A1 | | 10/2018 | Funk | |
| 2018/0344432 | A1 | | 12/2018 | Funk | |

OTHER PUBLICATIONS

European Patent Office, Extended European Search Report issued in corresponding EP Appl. No. 21197483.7 dated Mar. 18, 2022, 7 pages.

* cited by examiner

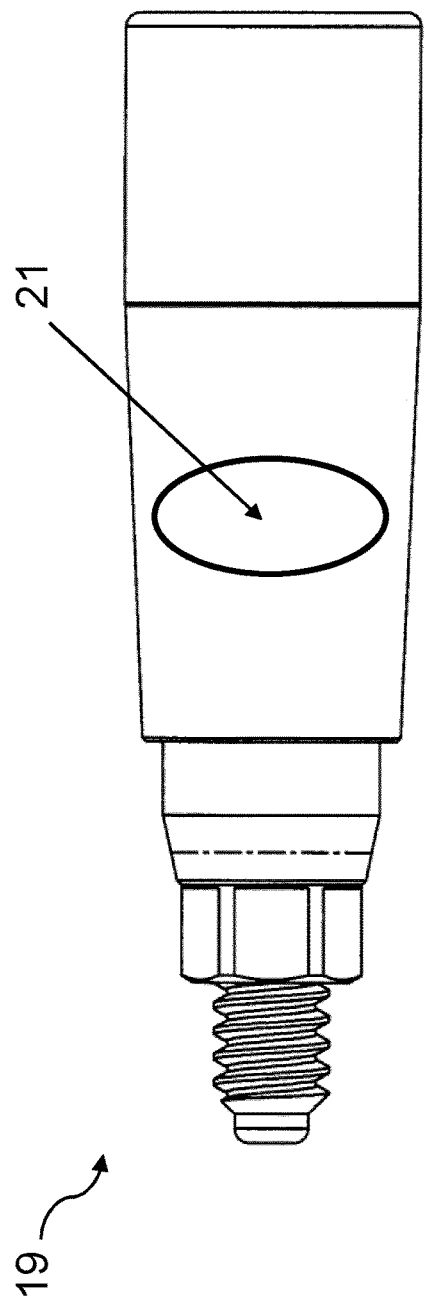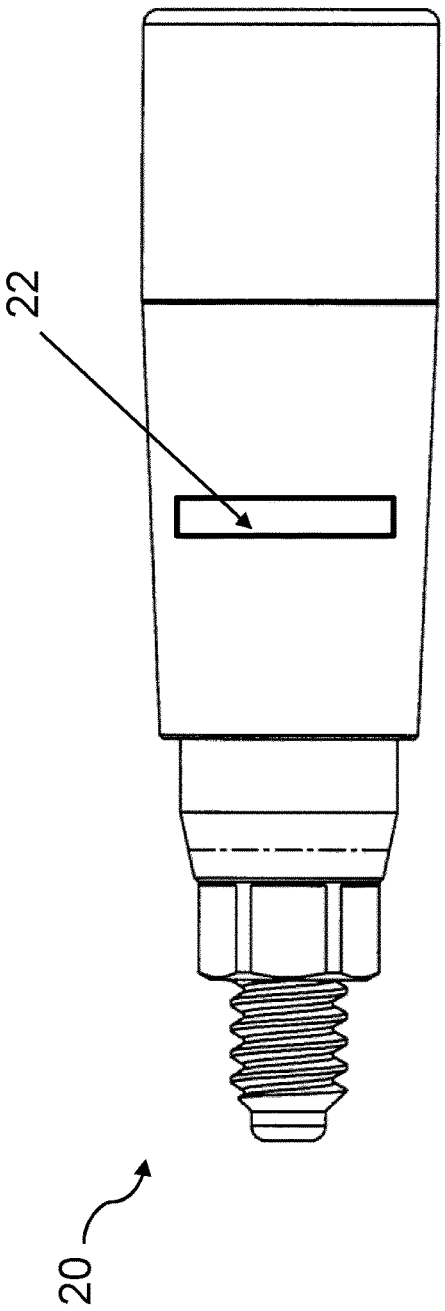

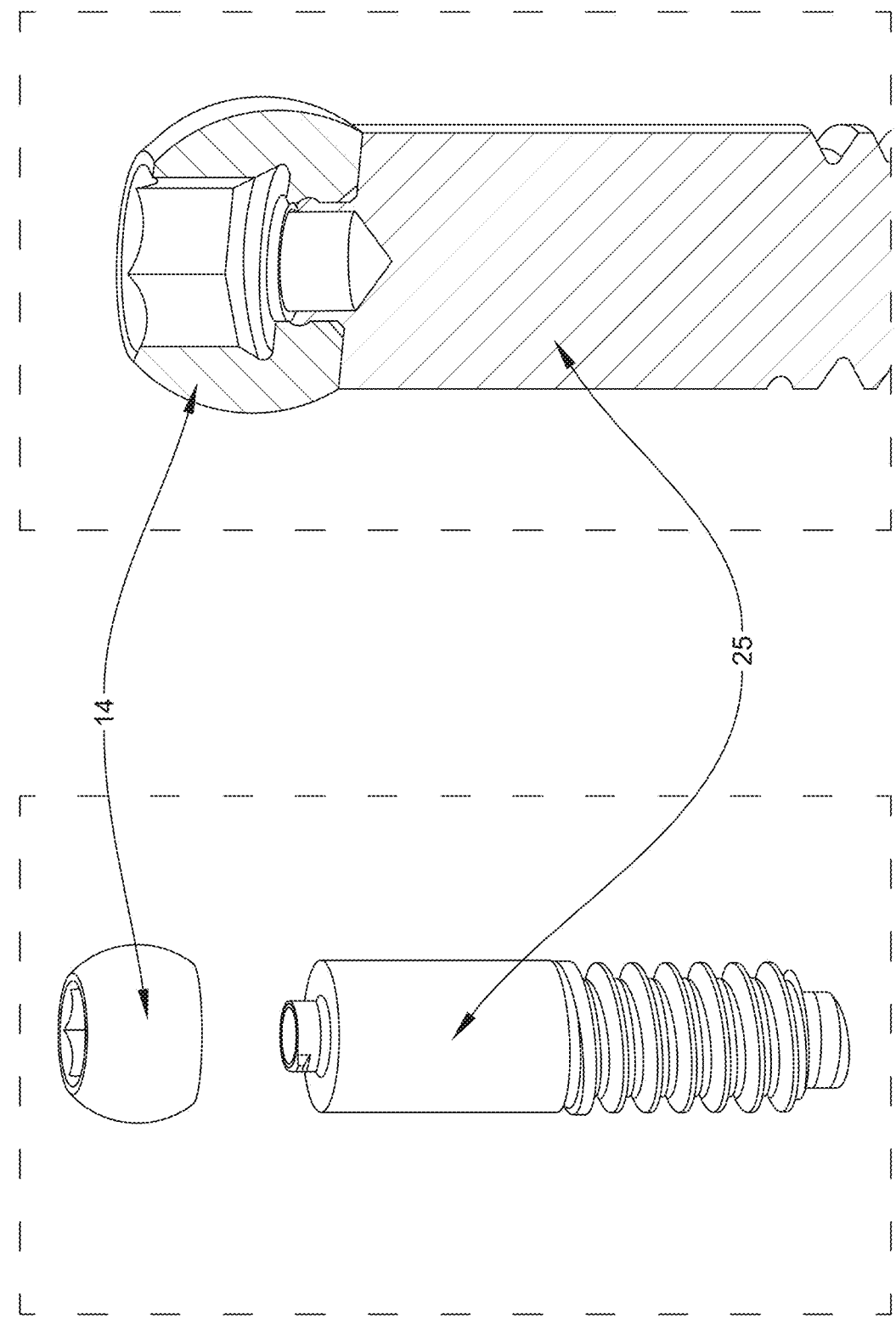

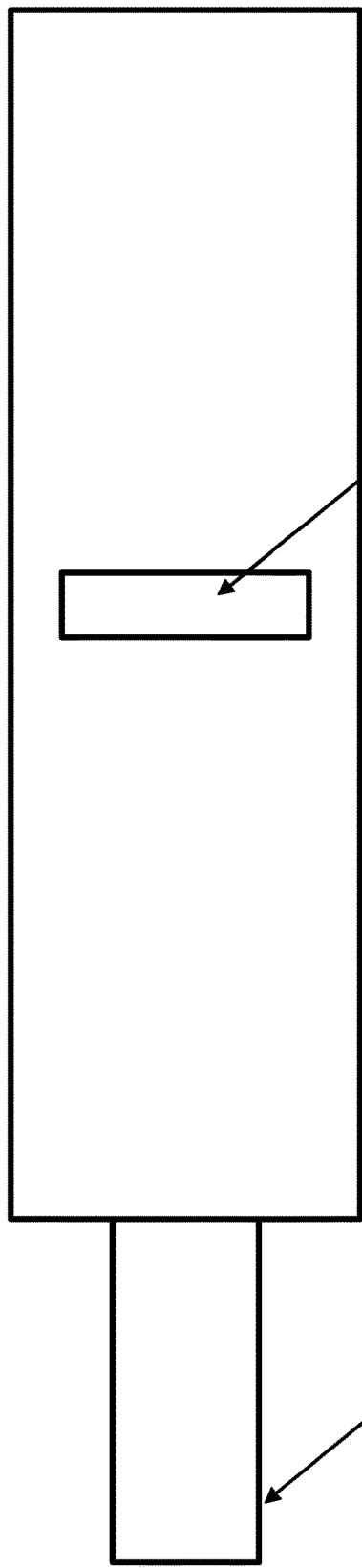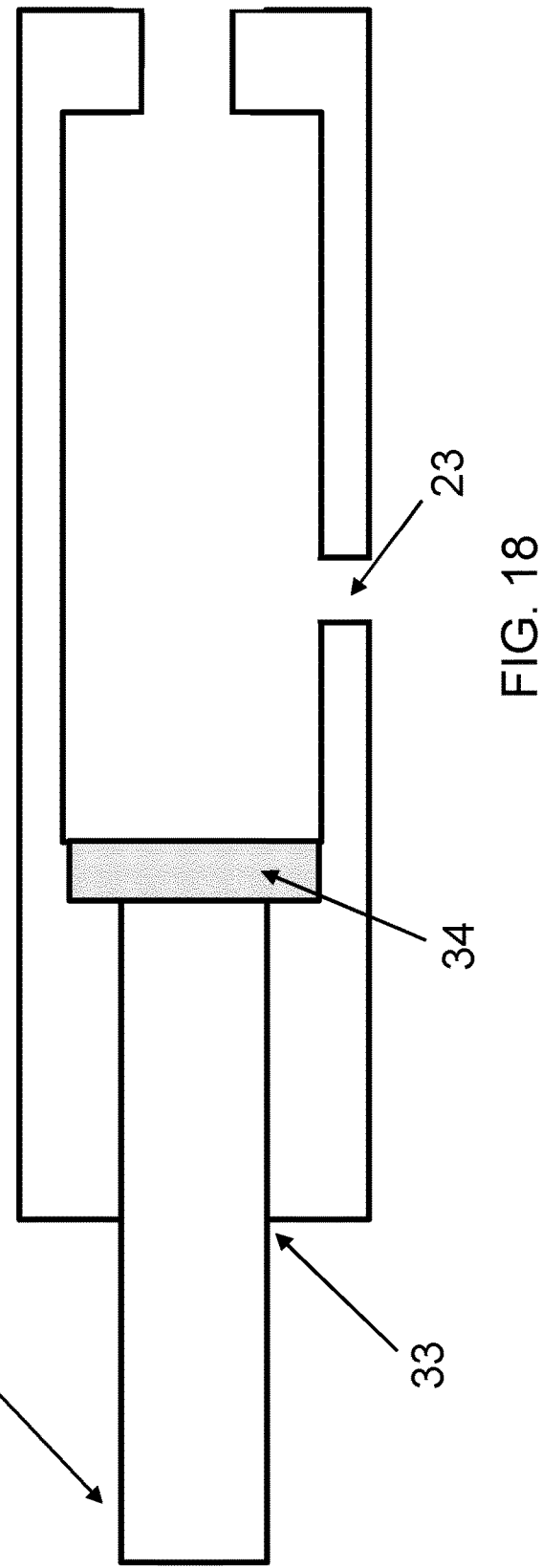

DENTAL ABUTMENT FOR INTER-ORAL SCANNING OR FOR EXTRA-ORAL SCANNING

CROSS-REFERENCE TO RELATED APPLICATIONS

The present application claims priority to PCT application serial no. PCT/EP2022/075755, filed Sep. 16, 2022, which claims priority to European patent application serial no. 21197483.7, filed Sep. 17, 2021, each herein incorporated by reference in their entireties.

FIELD OF THE INVENTION

The present invention relates to the field of devices for implantation. More specifically, the invention provides a scan body or scanning abutment for dental implants, which is suited for high precision inter-oral scanning while mounted on a dental implant. The scan body is also suited for scanning when mounted on an implant analog, e.g. mounted in a model of the patient's mouth.

BACKGROUND OF THE INVENTION

Custom made dental abutments, such as crowns or bridges for mounting on an implant fastened in the jaw bone of a patient, are commonly manufactured based on a scanning. A scanning is performed of a scan body element or scan body or scanning abutment mounted on an implant analog in a model of the patient's mouth, i.e. outside the patient's mouth. Alternatively, the scanning can be performed in the mouth of the patient with the scan body mounted on an implant, which has been implanted in the jaw bone of the patient, i.e. inter-orally. The scanning of a recognizable feature on the scan body serves to provide a precise information of the position and orientation of the scan body element, and thereby also providing information of the position and orientation of the implant or implant analog, so as to enable to make a digital representation of the patience mouth and using those data to create a custom abutment or a bridge that fits precisely onto the implant.

A known scan body includes a threaded base part that is screwed onto the implant. Once the base part has been fastened to the implant analog, the dentist or surgeon manually positions and presses a polymeric cap onto an upper portion of the base part. The polymeric cap has features recognizable in a subsequent scanning.

Other known scan bodies comprise several parts which may risk to be disassembled upon use resulting in unprecise inter-oral scanning or in loss of scan body parts within the patient's mouth.

An example of a known scan body is disclosed in WO 2019/162446.

It appears that these systems provide a rather poor precision in the scanning result with respect to the orientation of the implant, as the scan element is mounted on a further part screwed into the implant, thus introducing a possible error in determination of tilt angle of the implant. Therefore, the resulting dental bridge or bar manufactured based on such scan may suffer from imprecise fitting onto the implant which may cause various health problems, e.g. infections and bone deterioration, thus providing additional costs and pain for the patient. In general, a very high precision is required, down to a tolerance less than e.g. 5-6 μm.

Furthermore, it can be a rather cumbersome process to fasten each part necessary to do the scan individually on the implant, especially when the scanning is performed inter-orally. With known scan body, fastening may lead to undesired breakage.

Moreover, safety and hygiene issues may occur when using scan bodies inter-orally.

An improved scan body showing high degree of robustness and providing a more safe and hygienic approach for inter-oral use would be therefore advantageous.

Hence, an improved scan body would be advantageous, and in particular a more reliable, robust, easy to clean, safe and easy to produce scan body would be advantageous.

OBJECT OF THE INVENTION

An objective of the present invention is therefore to provide a scan body that can be easy to clean.

An object of the present invention is also to provide a scan body that is safe to be used inter-orally.

An object of the present invention is also to provide a method for assembly a scan body that reliability supply a scan body in a single piece.

An object of the present invention may also be seen as the provision of a robust scan body that avoid undesired breakage upon fastening to an implant or to an implant analog.

An even further object of the invention may also be seen as to provide an alternative to the prior art.

In particular, it may be seen as an object of the present invention to provide a scan body with an improved robustness, cleaning and safety features, which can be used to be fasten to an implant or an implant analog by having an optimized openings configuration.

SUMMARY OF THE INVENTION

The above described object and several other objects are intended to be obtained in a first aspect of the invention by a scan body insertable in, or on, a dental implant, or in, or on, an implant analog, and recognizable in an optical scanning system arranged for finding orientation and position of the scan body, the scan body comprising: a first hollow element and a second element for fastening or fixing the scan body to a dental implant or an implant analog.

The scan body can be inserted directly in or on an implant, directly in or on an implant analog. However, in some cases, the scan body may be inserted in or on an intermediate structure, e.g. an abutment mounted in or on the implant or implant analog.

The first hollow element is characterized by having a distal end, a middle or central section and a proximal end, wherein: the distal end comprises at least one geometric feature recognizable in an optical scanning system and the middle section comprises an opening, referred to as middle section opening.

The second element for fastening the scan body to a dental implant or an implant analog comprises: an elongated component having a top portion and an end threaded portion; the end threaded portion extending out of the proximal end of the first hollow element; the retaining means for retaining at least part of the elongated component within the first hollow element, the retaining means fasten to the top portion of the elongated component.

The presence of the second element allow for fastening the scan body to a dental implant or an implant analog. The second or internal element is located at least partially within the hollow area of the first hollow element.

In some embodiments, the first hollow element may have a cylindrical or conical shape. However, the first hollow element may also have other geometrical shapes.

The distal end of the first hollow element is the end located away from the dental implant or implant analog when in use.

The distal end comprises at least one geometric feature that is recognizable in an optical scanning system.

In some embodiments, the at least one geometric feature is an optical scanning recognizable portion, which is recognizable with respect to an angular position by having a cross-sectional planar first surface with respect to the longitudinal axis of the scan body.

The distal end has an opening along a longitudinal axis of the scan body, referred to as distal end opening.

The distal end opening is configured to allow for insertion of a tightening tool, such as a screwdriver or a screwdriver tip.

The distal end opening, e.g. a going-through hole, has dimensions, such as at least one dimension, arranged for insertion of the tightening tool, such as for the insertion of a screwdriver tip.

As to the wording "dimension" is referred therein as a measurable extent of a particular kind, such as length, breadth, depth, or height.

The dimension, shape or size of the distal end opening is optimized so have the minimal cross section allowing for insertion of the tightening tool.

A small distal end opening is preferred as to maximize the surface area of the distal end top surface, which is preferable for optimal and more precise scanning.

In some embodiments, the distal end opening has a dimension, such as a diameter, lower than 1.4 mm. In some embodiments, the distal end opening has a dimension, such as a diameter, smaller then the proximal end opening.

The proximal end of the first hollow element is the end located closer to the dental implant or implant analog, when in use.

The proximal end has an opening along a longitudinal axis of the scan body, referred to as proximal end opening.

The longitudinal axis is the axis spanning the length of the scan body from the distal end opening to the proximal end opening.

The proximal end opening is configured to allow for insertion of the elongated component of the second element, i.e. has dimensions, such as at least one dimension arranged for insertion of the elongated component of the second element. The insertion of the elongated component of the second element occurs prior to fastening of the retaining means. The elongated component is inserted within the hollow area of the first hollow element from the proximal end opening in the direction towards the distal end opening.

In some embodiments, the elongated component of the second element may have a cylindrical or conical shape. However, the elongated component of the second element may also have other geometrical shapes.

The function of the proximal end opening is to allow the insertion of the elongated component of the second element and in that its dimension, size or shape is at least as large as the cross section of the elongated component.

The distal end opening has a dimension, such as a diameter, allowing the elongated componented to rotate within the proximal end opening once it is inserted.

In some embodiments, the distal end opening has a dimension, such as a diameter, between 1.4 mm and 3 mm.

The middle section of the first hollow element is the area of the first hollow element between the distal end and the proximal end.

The middle section is characterized by the presence of an opening, i.e. the middle section opening, having several functions.

In some embodiments, the middle section opening has at least one dimension larger than the largest dimension of a cross section of the proximal end opening, the cross section being perpendicular to the longitudinal axis.

In some further embodiments, the middle section opening is configured to allow for inserting the retaining means of the second element into the first hollow element.

The middle section opening has the function of allowing for the introduction of retaining means to be fasten to the top part of the elongated component once it has been inserted through the proximal end opening.

As the retaining means have at least one dimension larger than the largest dimension of a cross section of the proximal end opening to be able to retaining at least part of the elongated component within the first hollow element, the middle section opening has to have a correspondent appropriate dimension.

The distal end opening is much smaller than the proximal end opening, as its only function is to accommodate the tightening tool tip, thus the middle section opening has at least one dimension larger than the largest dimension of a cross section of the distal end opening, the cross section being perpendicular to the longitudinal axis.

In some embodiments, the middle section opening is configured to allow for cleaning of hollow areas within the first hollow element, thereby allowing for cleaning of the hollow area accessible through the middle section opening.

The scan body of the invention is particularly advantageous as improving hygiene in inter-oral use.

The middle section opening has also dimensions, shape and size that allow for cleaning of undesired residual materials within the hollow area of the first hollow element.

The middle section opening may be circular, oval, have a slot shape or any other suitable shape allowing to perform its functions.

In some embodiments, the middle section opening has at least one dimension, such as a diameter, in the range between 1.4 and 3 mm.

The middle section opening may be a though-going hole or may be an opening only on one side of the middle section.

In some embodiments, the middle section opening is a side opening, i.e. an opening on the side of the first hollow element.

In some embodiments, the middle section opening is configured to allow for fastening of safety means, such as a safety thread, thereby avoiding misplacement of the scan body when in use.

The scan body of the invention is particularly advantageous for inter-oral use as reducing the risk of dropping undesired bodies in the patient's mouth.

This is achieved by having the elongated component fasten within the hollow area of the first hollow element, thus hindering any possible loss of undesired bodies in the patient's mouth.

Furthermore, a safety feature may be tightened to and/or through the middle section opening. The dentist or surgeon has thus a safer way to handle the single piece scan body within the patient's mouth. Hereby, the risk of dropping and having to retrieve the scan body in the patient's mouth is greatly reduced.

The middle section opening may be located below the mid-line of the middle section.

In some embodiments, the middle section opening is located in a lower end of the middle section, such as the end towards the proximal end of the first hollow element.

In some embodiments, the middle section opening has a centre located below the middle line of the first hollow element.

In some further embodiments, the middle section opening has a centre being more distant from the top surface of the distal end than from the bottom surface of the proximal end of the first hollow element.

In some embodiments, the middle section opening has a central axis intersecting a longitudinal axis of the scan body.

In some other embodiments, the central axis of the middle section opening is perpendicular to the longitudinal axis.

In some embodiments, the retaining means have at least one dimension larger than the largest dimension of a cross section of the distal end and the proximal end openings, the cross section being perpendicular to the longitudinal axis, thereby retaining at least part of the elongated component within the first hollow element.

The retaining means have the function of retaining at least part of the elongated component within the first hollow element by being fasten to the top portion of the elongated component.

To comply with its function, the retaining means have to have at least one external dimension, such as an external diameter, larger than the largest dimension of the proximal end opening and have to be fasten to the top portion of the elongated component.

In some embodiments, the retaining means are configured to engage with the top portion of the elongated component.

The elongated component is displaceable relative to the proximal end opening along the longitudinal axis of the scan body, before the fastening of the retaining means.

In some embodiments, the retaining means are fasten to the top portion of the elongated component by means of one or more exterior protrusions on the retaining means configured for being press fitted onto the top portion of the elongated component.

In some other embodiments, the retaining means are fasten to the top portion of the elongated component by means of one or more exterior protrusions on the top portion of the elongated component configured for being press fitted into the retaining means.

In some further embodiments, the retaining means are fasten to the top portion of the elongated component by means of glue, by means of laser welding, and/or by means of corresponding threads on the retaining means and on the top portion.

Retaining means and top portion of the elongated component may also be fasten through a bayonet connection.

In some embodiments, the retaining means are or comprise a ball or a cylindrical head configured to engage with the top portion of the elongated component.

In some other embodiments, the retaining means are or comprise a ring surrounding the top portion of the elongated component, the ring configured to retain at least part of the elongated component within the first hollow element.

The top or head portion may be or may comprise a ring, such as a lock ring, surrounding the top portion of the elongated component having a diameter sufficiently larger than the largest diameter of the elongated component, such as the largest diameter of a cross section of the elongated component.

A ring is herein defined as any circlet or open circlet having at least one dimension, such as an external diameter, larger than the one of the elongated component and thus of the proximal end opening, providing hindrance in sliding the elongated component out of the proximal end opening.

In some other embodiments, the retaining means may have other shape than circular, such as square, rectangular or triangular, having the same function of avoiding the sliding or pulling out of the elongated component through the proximal end opening once the retaining means is fasten to the elongated element.

In some embodiments, the retaining means comprise a head component or head element.

The head component, such as a screw head, may have an area that is at least partially threaded and may be configured to engage with threads of the top portion of the elongated component.

In some embodiments, the head component is configured to engage with a tightening tool insertable through the distal end opening, thereby allowing for fastening the scan body to a dental implant or an implant analog.

In some embodiments, the head component comprises a recess for receiving the tightening tool through the distal end opening.

In some other embodiments, the top portion of the elongated component is configured to engage with a tightening tool insertable through the distal end opening, while the head component has simply the function of retaining the elongated component.

The head component may be a screw head that can be fasted by means of glue, laser welding, and/or by means of corresponding threads on the retaining means and on the top portion of the elongated component In some embodiments, the first hollow element and/or second element may be made of a polymer comprising PEEK, a ceramic, Teflon®, polyoxymethylene (POM) or a combination thereof.

In some other embodiments, the first hollow element and/or second element may be made of a metal or an alloy comprising at least one of the following elements or alloy: Ti, Zr and steel.

In some further embodiments, the first hollow element and/or second element may be made from bio-compatible materials and arranged for inter-oral use.

In a second aspect, the invention relates to a method for assembling a scan body according to the first aspect, the method comprising: inserting the elongated component of the second element into the first hollow element through the proximal end opening; inserting the retaining means of the second element into the first element through the middle section opening; fastening the retaining means to the top portion of the elongated component by operating through the middle section opening.

Fastening may be referred to as secured to, such as locked in position.

In some embodiments, the fastening is by laser welding, gluing, threading, press fit, snap fit or by interference fit.

The first, second and other aspects and embodiments of the present invention may each be combined with any of the other aspects and embodiments. These and other aspects of the invention will be apparent from and elucidated with reference to the embodiments described hereinafter.

BRIEF DESCRIPTION OF THE FIGURES

The scan body and the method according to the invention will now be described in more details with regard to the accompanying figures. The figures show one way of implementing the present invention and are not to be construed as being limiting to other possible embodiments falling within the scope of the attached claim set.

FIGS. 4 and 5 show side views of two different embodiments of the scan body characterized by different side openings.

FIGS. 8 and 9 show a 3D view and a cross section view of the second element according to some embodiments of the invention, before and after the retaining means are fasten to the elongated component.

FIG. 17 is a schematic drawing of the scan body according to some embodiments of the invention.

FIG. 18 is a schematic cross section drawing of the scan body according to some embodiments of the invention.

DETAILED DESCRIPTION OF AN EMBODIMENT

Figure 1:
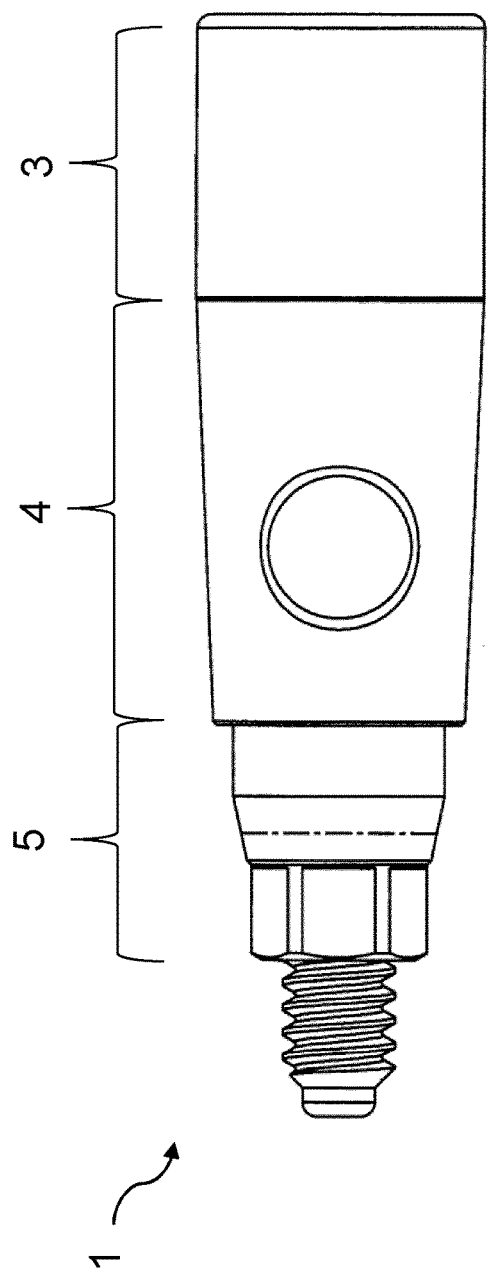
FIGS. 1 and 2 show two side views of the scan body according to some embodiments of the invention.
Figure 2:
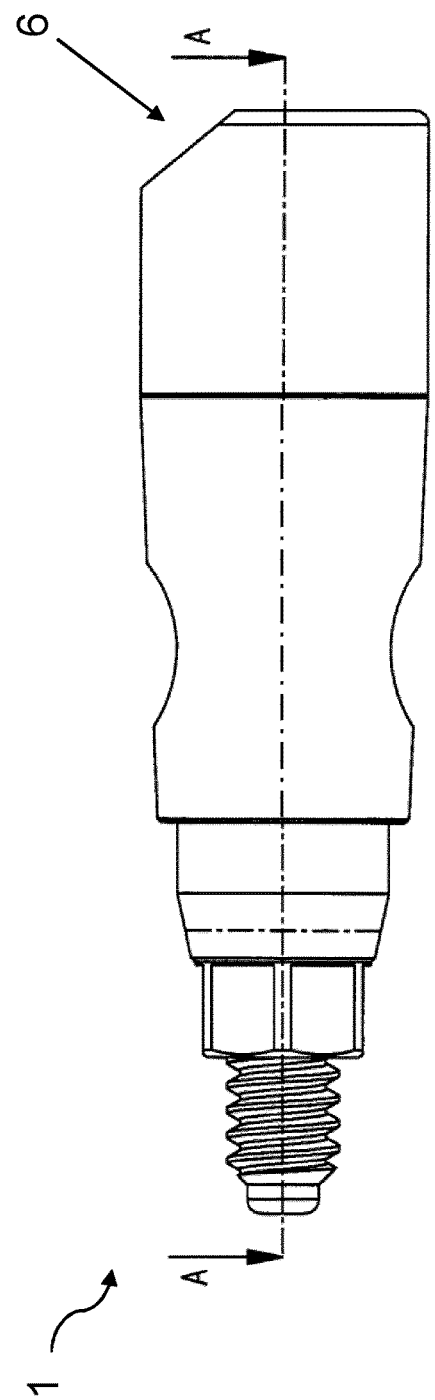

FIGS. 1 and 2 show two side views of the scan body 1 according to some embodiments of the invention.

The scan body 1 shows a geometric feature 6 recognizable in an optical scanning system for finding orientation and position of the scan body.

In FIG. 1 the three sections of the first hollow element of the scan body 1 are shown. The first hollow element shows a distal end 3, a middle section 4 and a proximal end 5.

Figure 3:
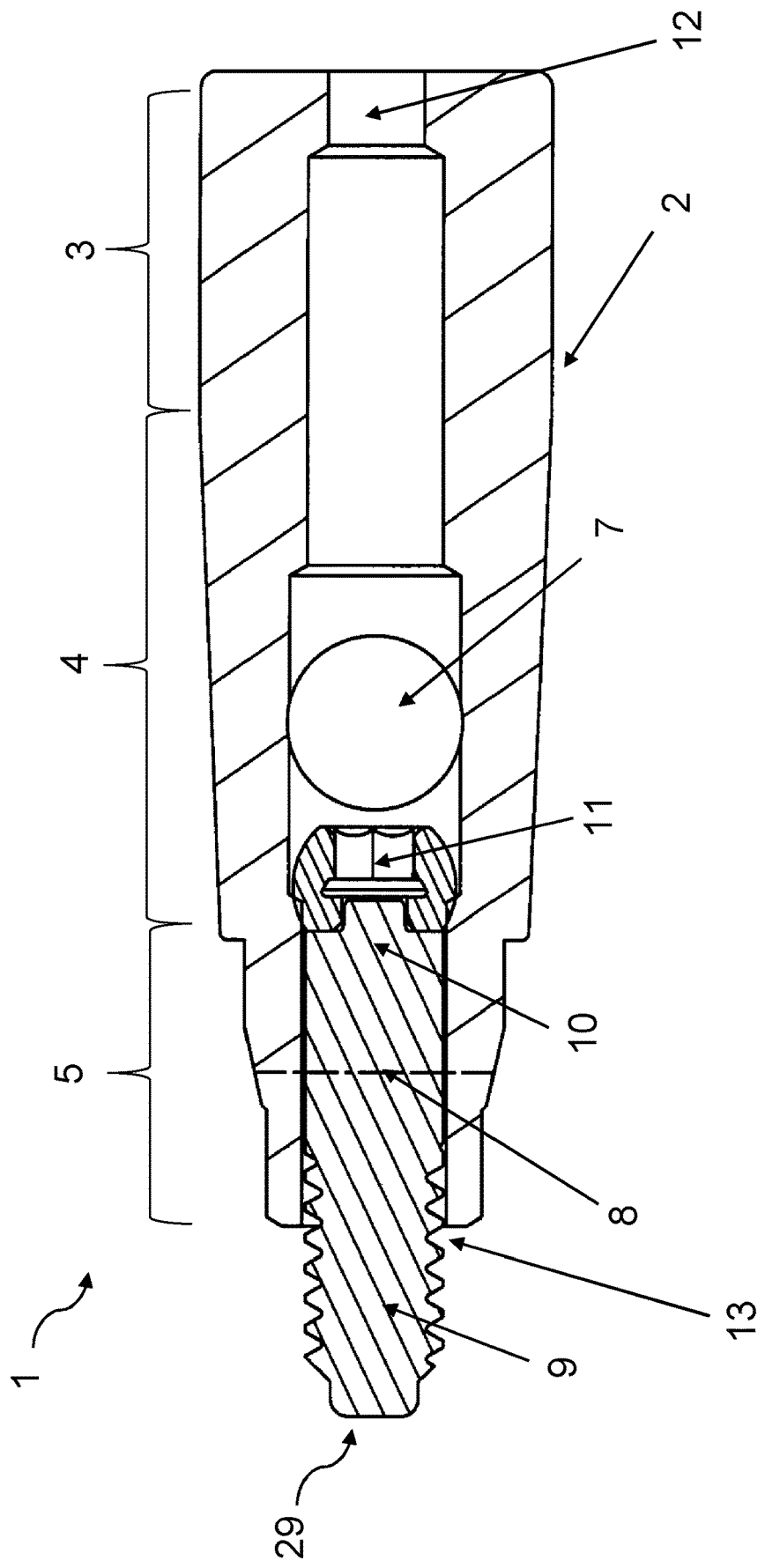
FIG. 3 shows a cross section along axis AA shown in FIG. 2 of the scan body according to some embodiments of the invention.

FIG. 3 shows a cross section of the scan body 1 along axis AA shown in FIG. 2.

In FIG. 3, the first hollow element 2 having a distal end 3, a middle section 4 and a proximal end 5 is shown.

The second element 29 is located in the hollow area of the first hollow element 2.

The a second element 29 comprises an elongated component 8 having a top portion 10 and an end threaded portion 9. The elongated component 8 is inserted within the hollow area of the first hollow element 2 through the proximal end opening 13.

Retaining means 11 are fastened to the top portion 10 of the elongated component 8 so as to retain at least part of the elongated component 8 within the first hollow element.

The retaining means 11 are introduced in the hollow area of the first hollow element 2 via the middle section opening 7.

The distal end opening 12 allows for insertion of a tightening tool, such as a screwdriver or a screwdriver tip to fasten the scan body 1 to a dental implant or an implant analog.

FIGS. 4 and 5 show side views of scan body 19 and 20 characterized by an oval and a rectangular side or middle section opening 21 and 22. The middle section openings 21 and 22 have a suitable shape allowing performing their functions.

Figure 7:
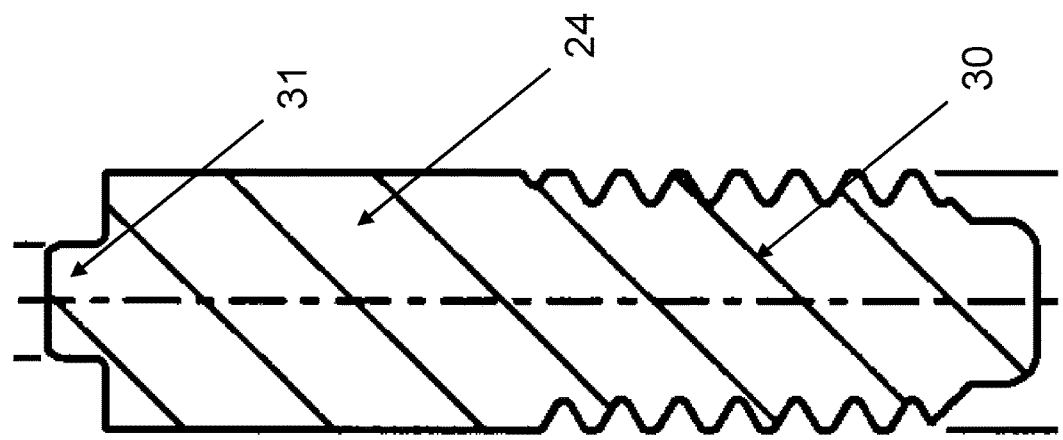
FIG. 7 shows a cross section of the elongated component of FIG. 6 according to some embodiments of the invention.
Figure 6:
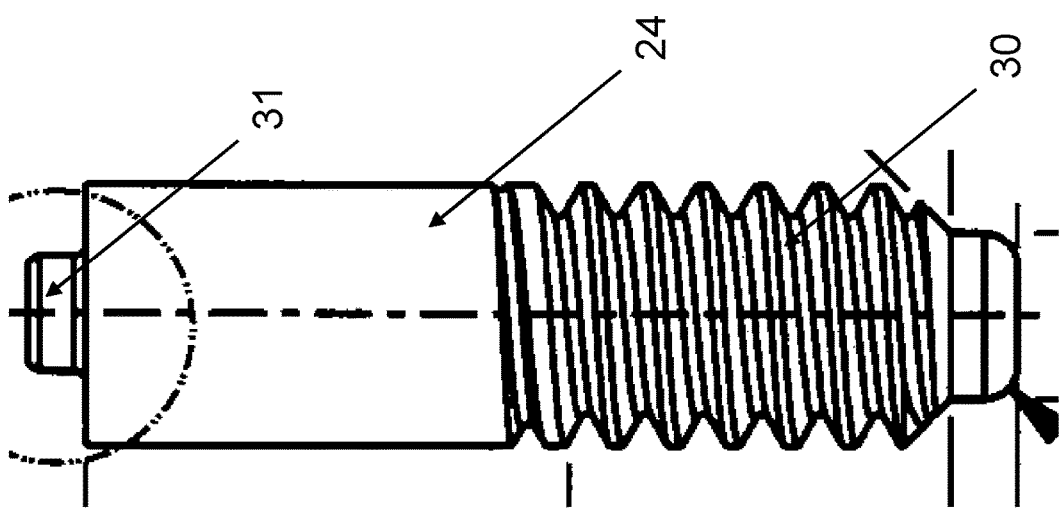
FIG. 6 shows a front view of the elongated component according to some embodiments of the invention.

FIGS. 6 and 7 show a front view and a cross section of the elongated component 24 according to some embodiments of the invention.

Elongated component 24 is characterized by a top portion 31 and an end threaded portion 30.

FIGS. 8 and 9 show a 3D view and a cross section view of the second element in which the retaining means comprise a head component 14.

The head component, or ball head 14, is fasten to the top portion of the elongated component 25 by a snap fit feature. The ball head 14 has an external diameter larger than the largest dimension of the proximal end opening and larger than the one of the elongated component 25.

Figures 10, 11:
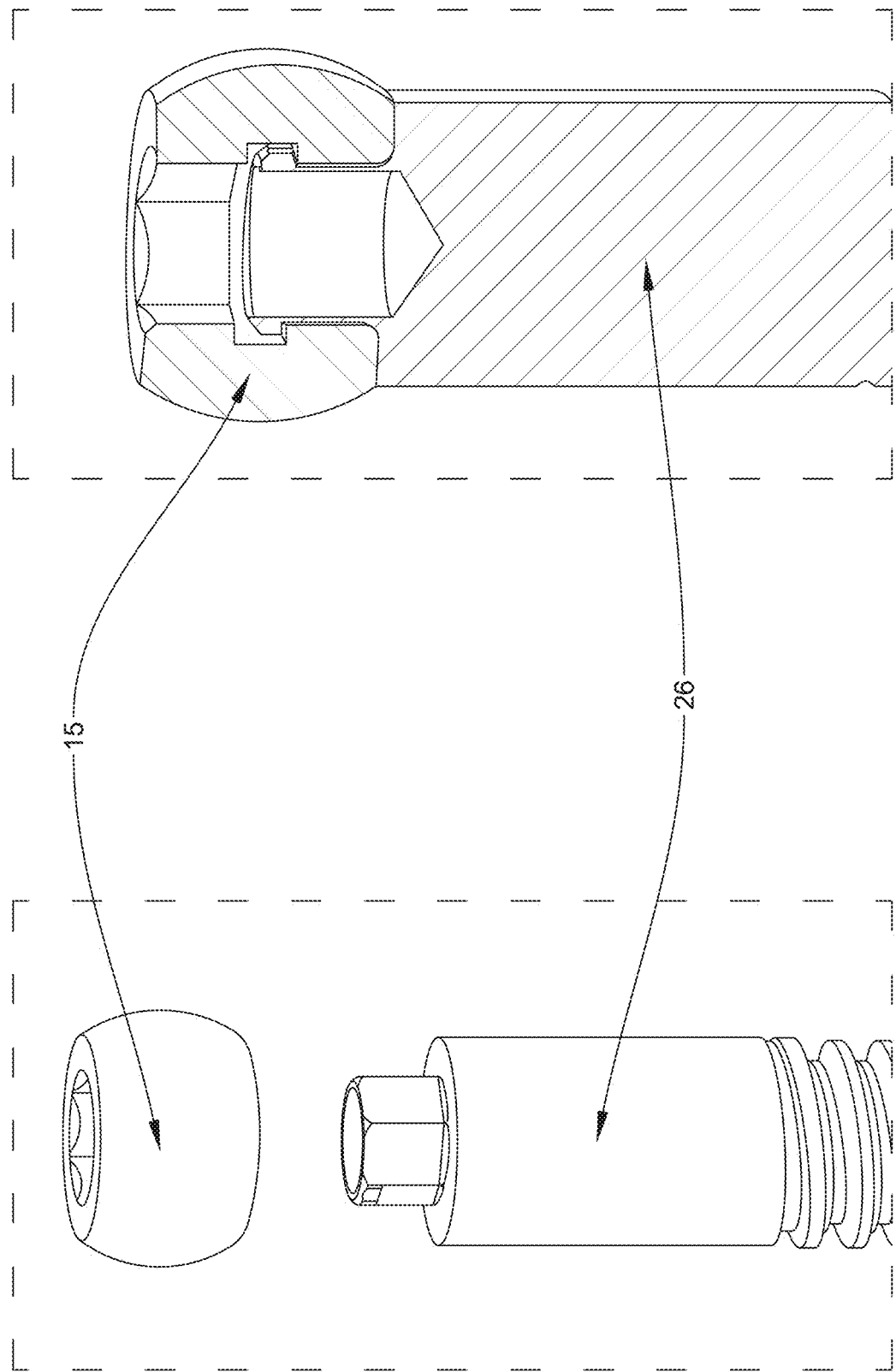
FIGS. 10 and 11 show a 3D view and a cross section view of the second element according to some other embodiments of the invention, before and after the retaining means are fasten to the elongated component.

FIGS. 10 and 11 show a 3D view and a cross section view of the second element in which the retaining means comprise a head component, such as a ball head 15. Ball head 15 is configured to engage with the top portion of the elongated component 26.

The ball head 15 comprises also a recess for receiving the tightening tool through the distal end opening.

Figure 13:
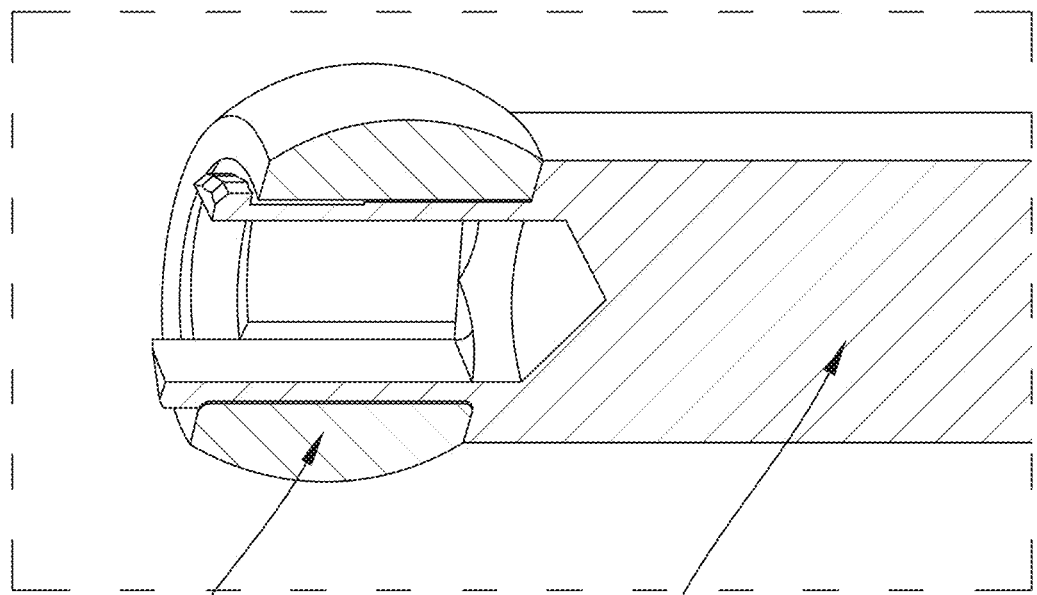
FIGS. 12 and 13 show a 3D view and a cross section view of the second element according to some further embodiments of the invention, before and after the retaining means are fasten to the elongated component.
Figure 12:
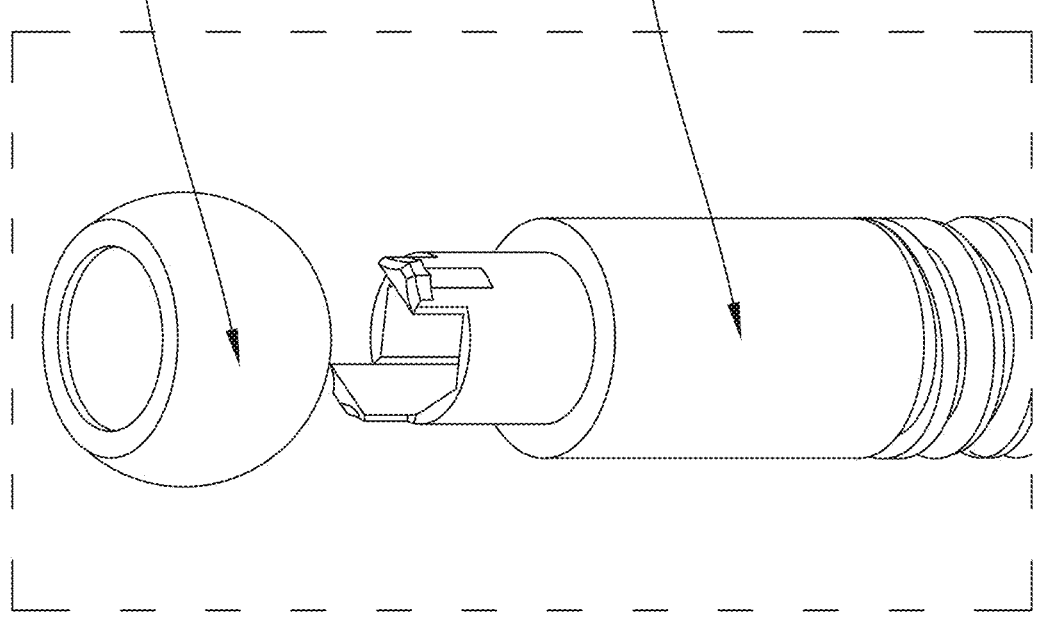

FIGS. 12 and 13 show a 3D view and a cross section view of the second element before and after the retaining means 18 is fasten to the elongated component 27.

The retaining means 18 is a ball head having an external diameter larger than the largest dimension of the proximal end opening.

Once ball head 18 is snap fitted onto the top portion of the elongated component 27, motion along the longitudinal axis of the scan body is hindered.

Elongated component 27 has a top portion configured to engage with a tightening tool insertable through the distal end opening, thereby allowing for fastening the scan body to a dental implant or an implant analog.

Figure 14:
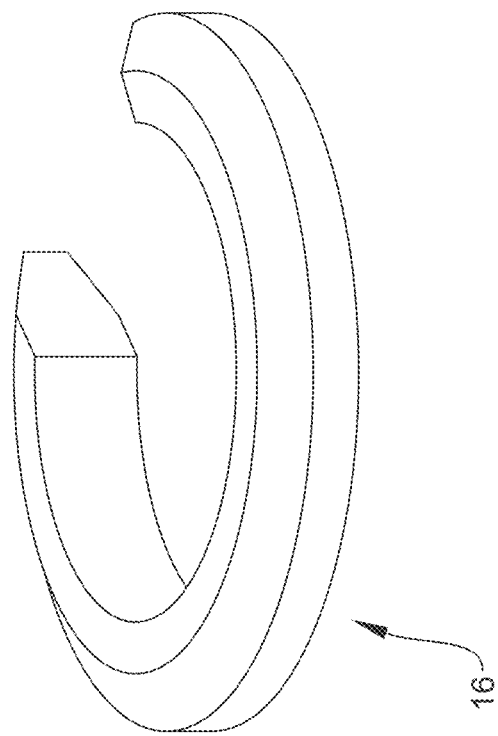
FIG. 14 is a 3D view of retaining means according to some embodiments of the invention.

FIG. 14 is a 3D view of retaining means, being an open ring 16.

Figure 15:
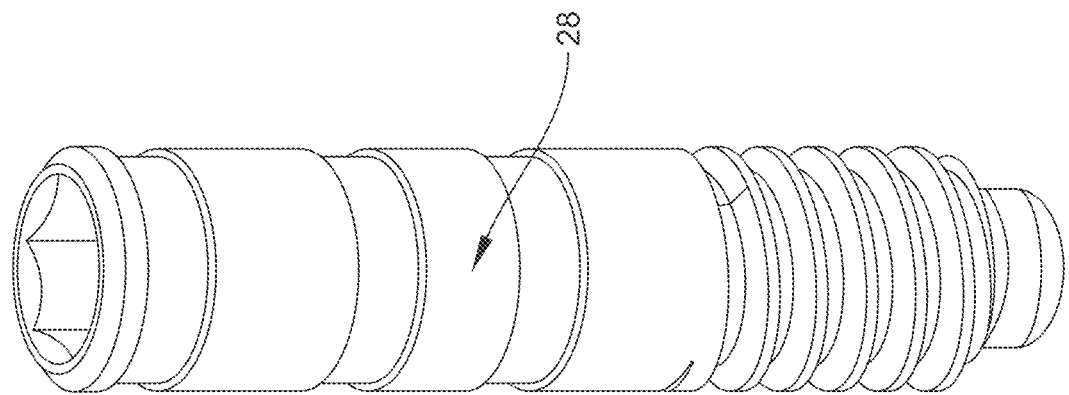
FIG. 15 is a 3D view of the elongated component according to some embodiments of the invention.

FIG. 15 is a 3D view of the elongated component 28. Open ring 16, once fasten to the top portion of elongated component 28, retains at least part of the elongated component 15 within the first hollow element.

Elongated component 28 has a top portion configured to engage with a tightening tool insertable through the distal end opening, thereby allowing for fastening the scan body to a dental implant or an implant analog.

Figure 16:
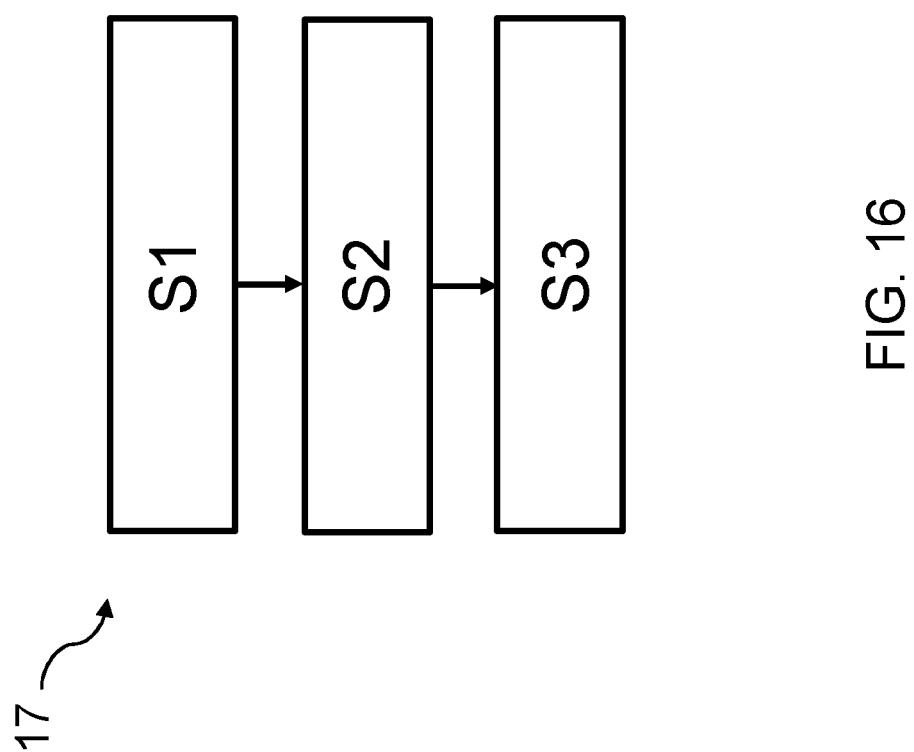
FIG. 16 shows a flow-chart of the method for assembling a scan body according to one aspect of the invention.

FIG. 16 shows a flow-chart of the method 17 for assembling a scan body according to one aspect of the invention.

The method 17 for assembling a scan body comprises the steps of:
  S1, inserting the elongated component of the second element into the first hollow element through the proximal end opening;
  S2, inserting the retaining means of the second element into the first element through the middle section opening;
  S3, fastening the retaining means to the top portion of the elongated component by operating through the middle section opening.

FIGS. 17 and 18 are a schematic drawing and a schematic cross section drawing of the scan body having a slot shape opening 23.

Once elongated component 32 is introduced through proximal end opening 33, retaining means 34 can be introduced through slot shape opening 23 and fasten to the top portion of the elongated component 32.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is possible and advantageous.

The invention claimed is:

1. A scan body insertable in, or on, a dental implant, or in, or on, an implant analog, and recognizable in an optical scanning system arranged for finding orientation and position of said scan body, said scan body comprising:
    a first hollow element having a distal end, a middle section and a proximal end, wherein:
        said distal end (3) comprises at least one geometric feature (6) recognizable in the optical scanning system;
        said middle section comprises an opening;
    a second element, for fastening said scan body to the dental implant or the implant analog, comprising:
        an elongated component having a top portion and an end threaded portion; said end threaded portion extending out of said proximal end of said first hollow element;
        a retaining means for retaining at least part of said elongated component within said first hollow element, said retaining means is configured to fasten to said top portion of said elongated component;
wherein said distal end and said proximal end each has an openings along a longitudinal axis of said scan body, wherein said middle section opening is a side bore through the sides of said middle section and the side bore includes a central axis transverse to the longitudinal axis of said scan body and the side bore is configured to allow for inserting said retaining means of said second element into said first hollow element, wherein said retaining means has a width larger than a width of a cross section of said distal end opening and a width of a cross section of said proximal end opening, said cross sections being perpendicular to said longitudinal axis, thereby retaining at least part of said elongated component within said first hollow element and wherein said distal end opening is configured to allow for insertion of a tightening tool.

2. The scan body according to claim 1, wherein said middle section opening has a width larger than the width of the cross section of said distal end opening and the width of the cross section of said proximal end opening.

3. The scan body according to claim 1, wherein said middle section opening is configured to allow for cleaning of hollow areas within said first hollow element, thereby allowing for cleaning of said hollow areas accessible through said middle section opening.

4. The scan body according to claim 1, wherein said middle section opening is configured to allow for fastening of a safety thread, thereby avoiding misplacement of said scan body when in use.

5. The scan body according to claim 1, wherein said proximal end opening is configured to allow for insertion of said elongated component prior to fastening of said retaining means.

6. The scan body according to claim 1, wherein said retaining means comprises a head component.

7. The scan body according to claim 6, wherein said head component or said top portion of said elongated component is configured to engage with a tightening tool insertable through said distal end opening, thereby allowing for fastening said scan body to a dental implant or an implant analog.

8. The scan body according to claim 1, wherein said retaining means is configured to engage with said top portion of said elongated component.

9. The scan body according to claim 1, wherein said retaining means is or comprises a ball or cylindrical head configured to engage with said top portion of said elongated component.

10. The scan body according to claim 1, wherein said retaining means is or comprises a ring surrounding said top portion of said elongated component, said ring configured to retain at least part of said elongated component within said first hollow element.

11. The scan body according to claim 1, wherein said retaining means is configured to fasten to said top portion of said elongated component by means of at least one of:
    one or more exterior protrusions on said retaining means configured for being press fitted onto said top portion of said elongated component;
    one or more exterior protrusions on said top portion of said elongated component configured for being press fitted into said retaining means;
    by means of glue;
    by means of laser welding;
    by means of corresponding threads on said retaining means and on said top portion.

12. The scan body according to claim 1, wherein said side bore has a central axis intersecting a longitudinal axis of said scan body.

13. The scan body according to claim 1, wherein said side bore has a central axis perpendicular to the longitudinal axis of said scan body.

* * * * *